(12) United States Patent
Niwa

(10) Patent No.: US 6,657,384 B1
(45) Date of Patent: Dec. 2, 2003

(54) APPARATUS FOR MEASURING LIGHT INTENSITY OF EXCIMER LAMP

(75) Inventor: Shunji Niwa, Tokyo (JP)

(73) Assignee: Hoya-Schott Corporation, Tokyo (JP)

(*) Notice: Subject to any disclaimer, the term of this patent is extended or adjusted under 35 U.S.C. 154(b) by 179 days.

(21) Appl. No.: 09/780,373

(22) Filed: Feb. 12, 2001

(30) Foreign Application Priority Data

Feb. 16, 2000 (JP) .......................................... 2000-37982

(51) Int. Cl.[7] .......................... H01J 40/00; H01J 40/16; G01J 1/42
(52) U.S. Cl. ...................... 313/523; 313/524; 313/539; 250/372; 250/214 R
(58) Field of Search ................................ 313/523, 539, 313/541, 643, 524; 250/372, 214 R, 214.1, 214 W, 221, 222.1; 324/96, 501, 76.36; 356/500

(56) References Cited

U.S. PATENT DOCUMENTS

| 4,171,909 A | * | 10/1979 | Kramer et al. ................. 356/73 |
| 5,510,158 A | | 4/1996 | Hiramoto et al. ............ 427/582 |
| 5,723,943 A | * | 3/1998 | Brooker et al. ............. 313/524 |
| 6,316,877 B1 | * | 11/2001 | Kaas ............................. 315/56 |
| 6,369,523 B2 | * | 4/2002 | Matsuura et al. ........... 315/291 |

FOREIGN PATENT DOCUMENTS

JP    8-136339    5/1996

* cited by examiner

Primary Examiner—Sandra O'Shea
Assistant Examiner—Peter Macchiarolo
(74) Attorney, Agent, or Firm—Nixon & Vanderhye P.C.

(57) ABSTRACT

Provided is a small-sized less expensive light-intensity measuring apparatus for measuring a xenon excimer lamp that radiates a light beam having a central wavelength of 172 nm for an intensity.

The light-intensity measuring apparatus of the present invention comprises a photoelectric converting means 23, preferably a photodiode, having photosensitivity in the range of from 800 to 1,000 nm, an operating means 25 for relatively determining the intensity of a light beam having a central wavelength of 172 nm depending upon an output of the photoelectric converting means 23 and a transmitting means 26 for transmitting the light intensity determined with the operating means 25.

8 Claims, 5 Drawing Sheets

Fig.4
(A)
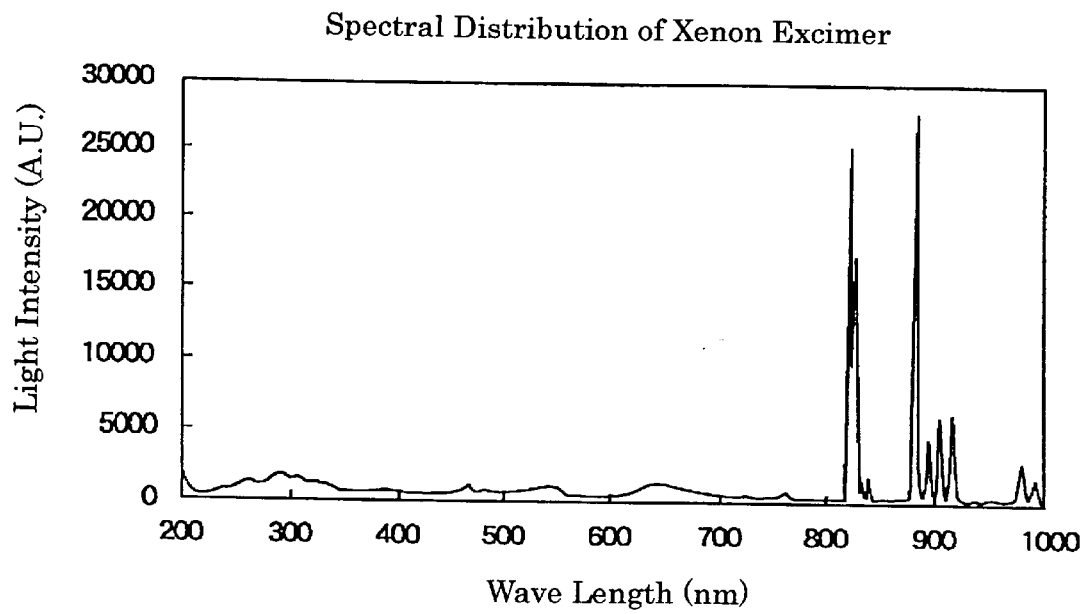
(B)
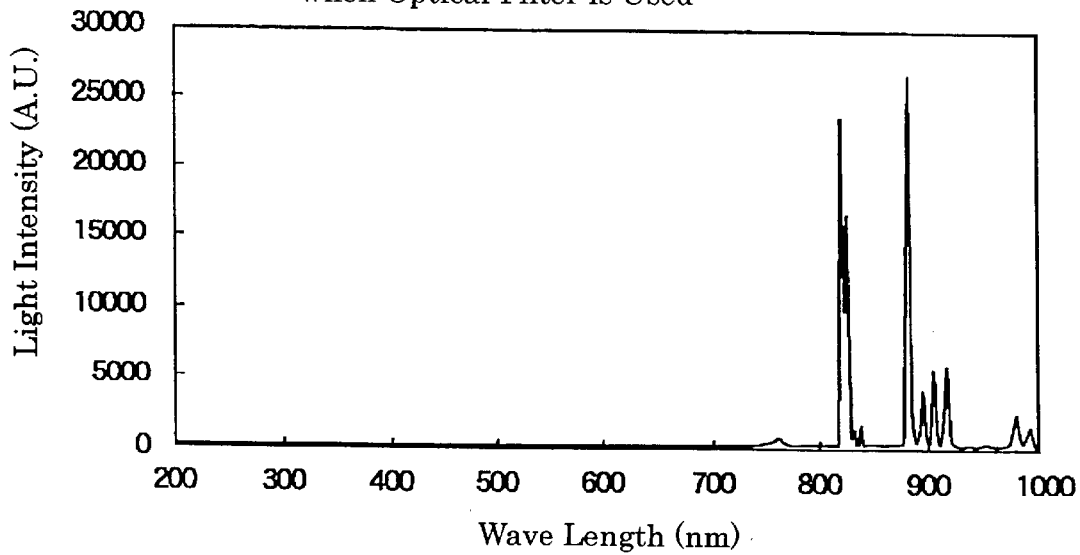

APPARATUS FOR MEASURING LIGHT INTENSITY OF EXCIMER LAMP

BACKGROUND OF THE INVENTION

1. Field of the Invention

The present invention relates to a light intensity measuring apparatus for measuring a xenon excimer lamp that radiates a light beam having a central wavelength of 172 nm for a light intensity and an apparatus for detecting whether a xenon excimer lamp is on or off.

2. Related Art Statement

The tolerable level of contamination of semiconductor integrated circuits and liquid crystal substrates with organic compounds is becoming more severe with their finer processing. In their fabricating steps, therefore, techniques for optical cleaning or optical modification attract attention in recent years. In the optical cleaning or optical modification, a work is irradiated with a vacuum ultraviolet light beam for a predetermined period of time to cause a chemical reaction in an organic compound adhering to the surface thereof, whereby the surface is cleaned or modified.

As a light source for the above use, a xenon excimer lamp, particularly, a xenon excimer lamp having xenon sealed therein attracts attention, and introduction thereof into production lines has already started. The xenon excimer lamp having xenon sealed therein radiates a vacuum ultraviolet light beam, the light beam having a wavelength of 172 nm, and when the lamp is irradiated in an atmosphere containing oxygen, therefore, oxygen molecules ($O_2$) absorb the light to generate active oxygen species such as oxygen atoms (O) and ozone ($O_3$). Further, a light beam having a wavelength of 172 nm has a high photon energy of as high as approximately 7.2 eV, which is greater than bonding energies of most organic substances. When irradiation with the light beam having a wavelength of 172 nm is carried out, therefore, the chemical bonding of an organic compound can be broken, and the chemical compound can be efficiently removed by oxidation and decomposition thereof with generated active oxygen species.

When silicon wafers or liquid crystal substrates are cleaned or surface-modified with such a xenon excimer lamp, it is essential to measure a light beam radiated from the lamp for an intensity for finding performances thereof, and in an ultraviolet light beam irradiating apparatus having a xenon excimer lamp, it is required to confirm that the xenon excimer lamp is properly working, i.e., is on during the operation of the apparatus.

For measuring the above xenon excimer lamp for a light intensity or detecting on/off of the lamp, it is thinkable to use a light-sensing device having an optical sensitivity to the above light beam having a wavelength of 172 nm. As described above, however, the light beam having a wavelength of 172 nm has a relatively large photon energy, which causes a problem that a light-sensing device is therefore deteriorated to a great extent, and further, few devices have high productivity as such a device, which involves a problem that the cost of the device increases.

For the above reasons, conventionally, it is general practice to measure a xenon excimer lamp for a light intensity by the following method.

(a) A method in which the measurement is carried out with a photoelectric tube having sensitivity at 172 nm.

(b) A method in which a fluorescent material is irradiated with a light beam having a wavelength of 172 nm to convert the light to visible light, and the visible light is received in a light-sensing device sensitive to visible light such as a silicon photodiode, to measure the light intensity(e.g., JP-A-8-136339).

The former method of using a photoelectric tube has a problem that a supplementary apparatus is required so that the entire apparatus is increased in size and that the cost therefor increases. The latter method for the measurement with a combination of a fluorescent material and a photodiode has a problem that the fluorescent material is deteriorated by irradiation with the above ultraviolet light beam.

SUMMARY OF THE INVENTION

It is therefore an object of the present invention to provide a small-sized and less expensive light-intensity measuring apparatus and an on/off detecting apparatus for a xenon excimer lamp, which require no supplementary apparatus.

It is another object of the present invention to provide a light-intensity measuring apparatus and an on/off detecting apparatus for measuring a light beam having a wavelength of 172 nm for a light intensity with a device or part which is not much deteriorated with ultraviolet light beams.

The present invention is concerned with a light-intensity measuring apparatus for measuring a xenon excimer lamp that radiates a light beam having a central wavelength of 172 nm for a light intensity. The light-intensity measuring apparatus of the present invention has a characteristic feature in a constitution having a photoelectric converting device having a photosensitivity in a range of from 800 to 1,000 nm. Further, the light-intensity measuring apparatus of the present invention preferably comprises an operating means for relatively determining the intensity of a light beam having a central wavelength of 172 nm and a transmitting means for transmitting the light intensity determined with the above operating means.

The above operating means is preferably for relatively determining the intensity of the light beam having a central wavelength of 172 nm on the basis of a light-intensity integral value of spectrum of light in the range of from 800 to 1,000 nm.

In an experiment conducted by the present inventor, the intensity of the light beam at 172 nm emitted from a xenon excimer lamp and the total sum of light intensity of spectrum of light in the range of from 800 to 1,000 nm have a correlation as shown in a graph of FIG. 1. This result has clearly showed that the intensity of the light beam at 172 nm can be relatively determined on the basis of the total sum of light intensities of spectrum of light in the range of from 800 to 1,000 nm.

Preferably, the light-intensity measuring apparatus of the present invention further has an optical filter for shutting off the input of light having a wavelength of 800 nm or shorter into the above photoelectric converting device.

The present invention is further concerned with an on/off detecting apparatus for detecting whether the xenon excimer lamp that radiates a light beam having a central wavelength of 172 nm is on or off. The on/off detecting apparatus has a characteristic feature in a constitution comprising a photoelectric converting device having a sensitivity to light in the range of from 800 to 1,000 nm. Further, preferably, the on/off detecting apparatus of the present invention has a constitution having a comparator for comparing an output of the above photoelectric converting device with a predetermined reference value to determine whether the xenon excimer lamp is on or off and a transmitting means for transmitting an on- or off-state of the xenon excimer lamp on the basis of a result of the above comparator.

Preferably, the on/off detecting apparatus of the present invention also has an optical filter for shutting off the input of light having a wavelength of 800 nm or shorter into the above photoelectric converting device.

In the present invention, further, there may be employed a constitution in which the above light-intensity measuring apparatus or the above on/off detecting apparatus is incorporated into an ultraviolet light beam irradiating apparatus having a xenon excimer lamp.

BRIEF DESCRIPTION OF THE DRAWINGS

FIG. 4 shows spectral characteristics of a xenon excimer lamp in 200 to 1,000 nm in one Example. FIG. 4(A) shows spectral characteristics when no optical filter is used, and FIG. 4(B) shows spectral characteristics when an optical filter is used.

BEST MODES OF THE INVENTION

Figure 2:
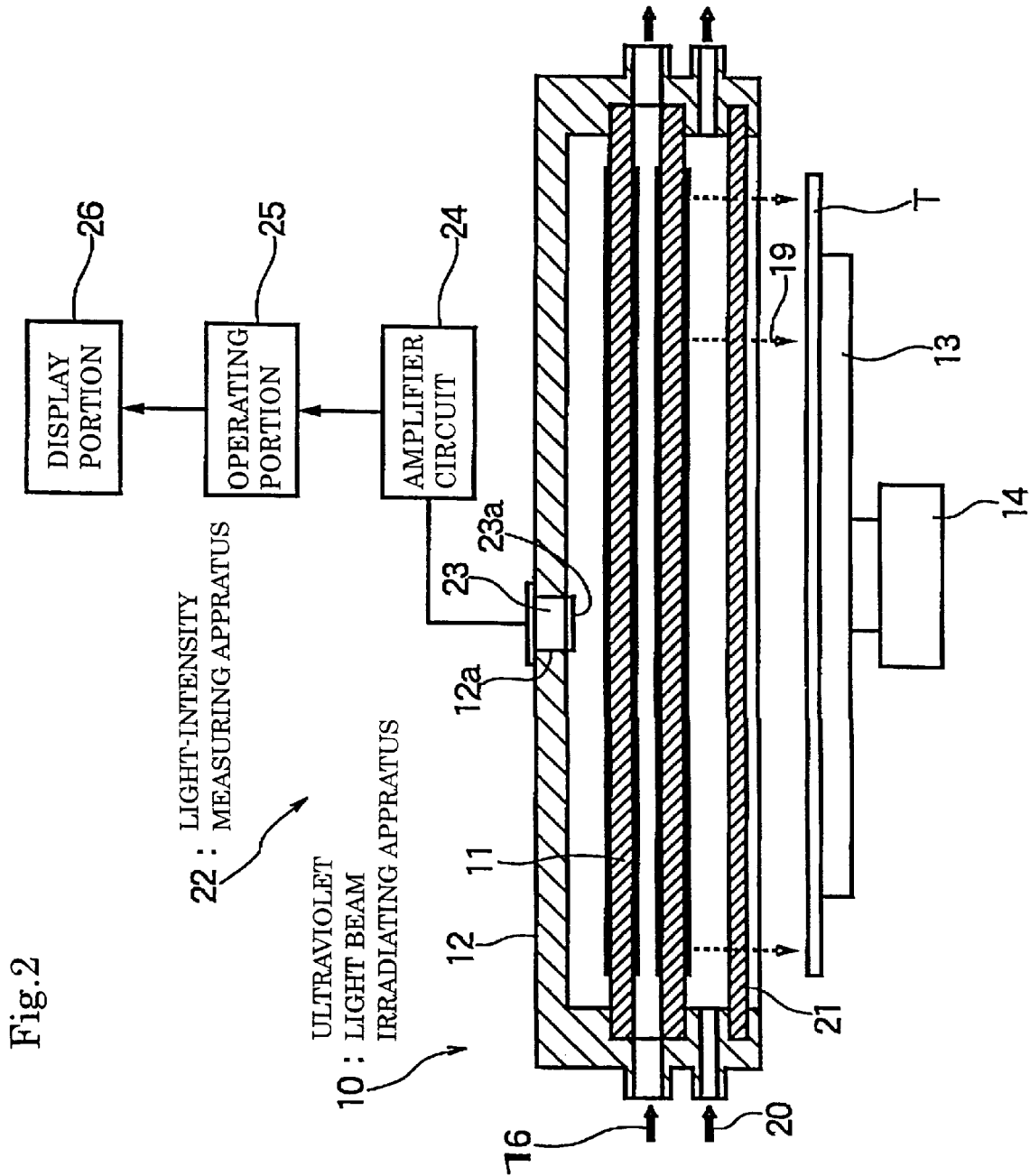
FIG. 2 is a schematic constitution drawing of an ultraviolet light beam irradiating apparatus having a light-intensity measuring apparatus according to one Example of the present invention.

The present invention will be explained in detail with reference to one Example shown in drawings. FIG. 2 is a schematic constitution drawing of an ultraviolet light beam irradiating apparatus having a light-intensity measuring apparatus according to one Example of the present invention. An ultraviolet light beam irradiating apparatus 10 according to this Example has a lamp housing 12 having a xenon excimer lamp 11 as a vacuum ultraviolet light beam source, a table 13 for holding a work T thereon and a motor stage 14 for rotating the table 13 with the work held thereon. The work T to be cleaned or modified with the ultraviolet light beam irradiating apparatus 10 is, for example, a silicon wafer substrate for producing an integrated circuit, a compound semiconductor silicon wafer substrate such as gallium arsenic for producing a laser diode or LED, and a glass substrate for producing a flat panel display such as a liquid crystal display or a plasma display panel. These substrates have different states depending upon their production processes, and they are in various states such as an exposed state of silicon or glass or a coated state in which they are coated with an oxide film, a resist, a color filter, a transparent electrically conductive film, a metal film, or the like. The ultraviolet light beam irradiating apparatus 10 of the present invention can be used for cleaning or modification of the surface of works in these various states.

Figure 3:
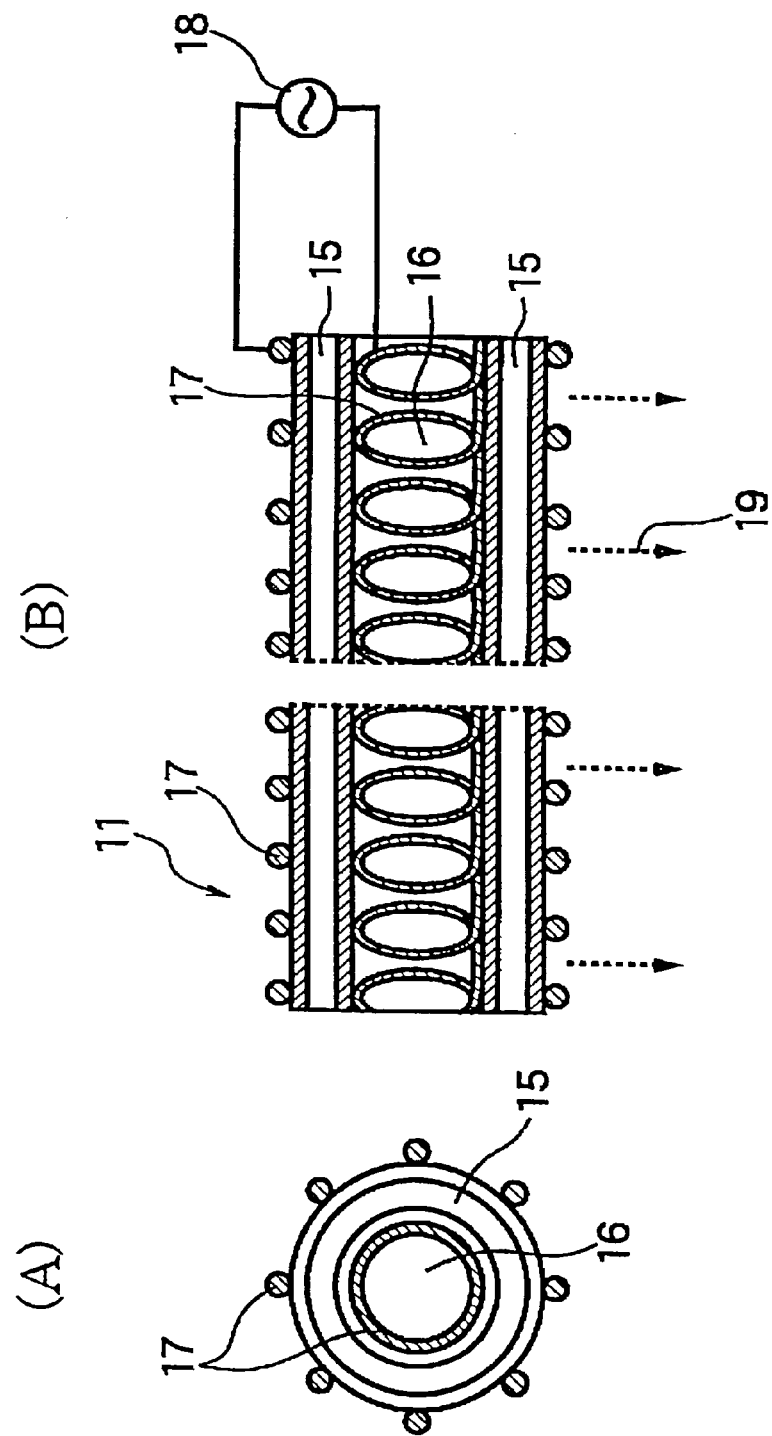
FIGS. 3(A) and 3(B) are constitution drawings of a xenon excimer lamp placed inside a lamp housing.

As shown in FIGS. 3(A) and 3(B), the xenon excimer lamp 11 placed inside the lamp housing 12 is constituted by providing a dual tube made of a synthetic quartz glass, closing both ends thereof and charging a discharge gas 15 made mainly of xenon in a space between the tubes. Inside the inner tube, a cooling medium 16 such as pure water is allowed to flow for cooling. Metal electrodes 17 are attached onto internal and external surfaces of the dual tube while sandwiching walls of the synthetic quartz glass tubes charged with xenon gas (wavelength 172 nm). A high-frequency high voltage of 1 to 10 kV is applied between the two electrodes 17 from a power source 18, to cause discharge plasma, whereby the discharge gas (xenon gas) is excited to come into an excimer state. The excimer state is very unstable, and the discharge gas instantaneously comes back to its ground state, when light (excimer light) 19 is radiated. The xenon excimer lamp 11 naturally generates intense forward monochromatic beam at 172 nm, and the lamp also emits light of 800 nm to 1,000 nm spectrum. The light-intensity measuring apparatus to be described later uses this light.

Inside the lamp housing 12 in FIG. 2, nitrogen gas 20 as an inert gas is substituted for directing a vacuum ultraviolet light beam radiated from the xenon excimer lamp 11 out of the lamp housing 12 without using it uselessly. The purpose in substitution of the nitrogen gas is to prevent the attenuation of the vacuum ultraviolet light beam caused by oxygen. In practicing the present invention, the nitrogen gas can be replaced with an inert gas such as helium, argon or neon.

The above lamp housing 12 is provided with a synthetic quartz glass 21 as a window material not only for closing the above inert gas inside but also for directing a light beam radiated from the xenon excimer lamp 11 out of the lamp housing 12. The ultraviolet light beam from the xenon excimer lamp 11 is transmitted through the above synthetic quartz glass 21, and the work T is irradiated therewith. The internal wall surface of the above lamp housing 12 is mirror-processed, whereby the ultraviolet light beam radiated upward from the xenon excimer lamp 11 is reflected thereon and directed toward the synthetic quartz glass 21. A reflection mirror made of aluminum may be provided instead of mirror-processing the above internal wall surface.

The table 13 for holding the work T is supported on the motor stage 14 and is thereby horizontally rotated. By the horizontal rotation, the entire surface of the work T on the table 13 can be uniformly irradiated with a vacuum ultraviolet light beam. The above structure is particularly suitable for cleaning or modifying a disk-shaped work such as a semiconductor silicon wafer. Naturally, the present invention may use a structure in which the work T is fixed in an ultraviolet light beam irradiation range without rotating it or the work T is linearly moved.

In the present invention, the ultraviolet light beam irradiating apparatus 10 further has a light-intensity measuring apparatus 22 for measuring a light beam radiated from the xenon excimer lamp 11 for an intensity. The light-intensity measuring apparatus 22 comprises a photodiode 23 as a photoelectric converting device, an amplifier circuit 24, an operating portion 25 and a display portion 26.

The photodiode 23 is fit to a hole 12a made in an upper portion of the lamp housing 12, and its light-receiving surface is allowed to face the xenon excimer lamp 11 in the lamp housing 12. The photodiode 23 has photosensitivity at least to light beam of spectrum at 800 nm to 1,000 nm from the xenon excimer lamp 11 shown in FIG. 1 and outputs an electric signal depending upon its intensity. That is, as the photodiode 23, the present invention uses a photodiode having excellent spectral sensitivity characteristic to light in the range of from 800 nm to 1,000 nm (e.g., PD480PI supplied by Sharp Corporation). There may be naturally used other photoelectric converting device having such photosensitivity, such as a near infrared receiving device.

In preferred Example, the light-receiving surface of the photodiode 23 may be provided with an optical filter 23a for shutting off light having a wavelength of 800 nm or shorter.

The optical filter 23a shuts off disturbing light that would enter the photodiode 23, so that the photodiode 23 can respond to intended light. FIG. 4 shows spectral characteristics of a xenon excimer lamp at 200 to 1,000 nm in one embodiment. FIG. 4(A) shows such characteristics when the optical filter 23a is not used, and FIG. 4(B) shows such characteristics when the optical filter 23a is used.

Figure 1:
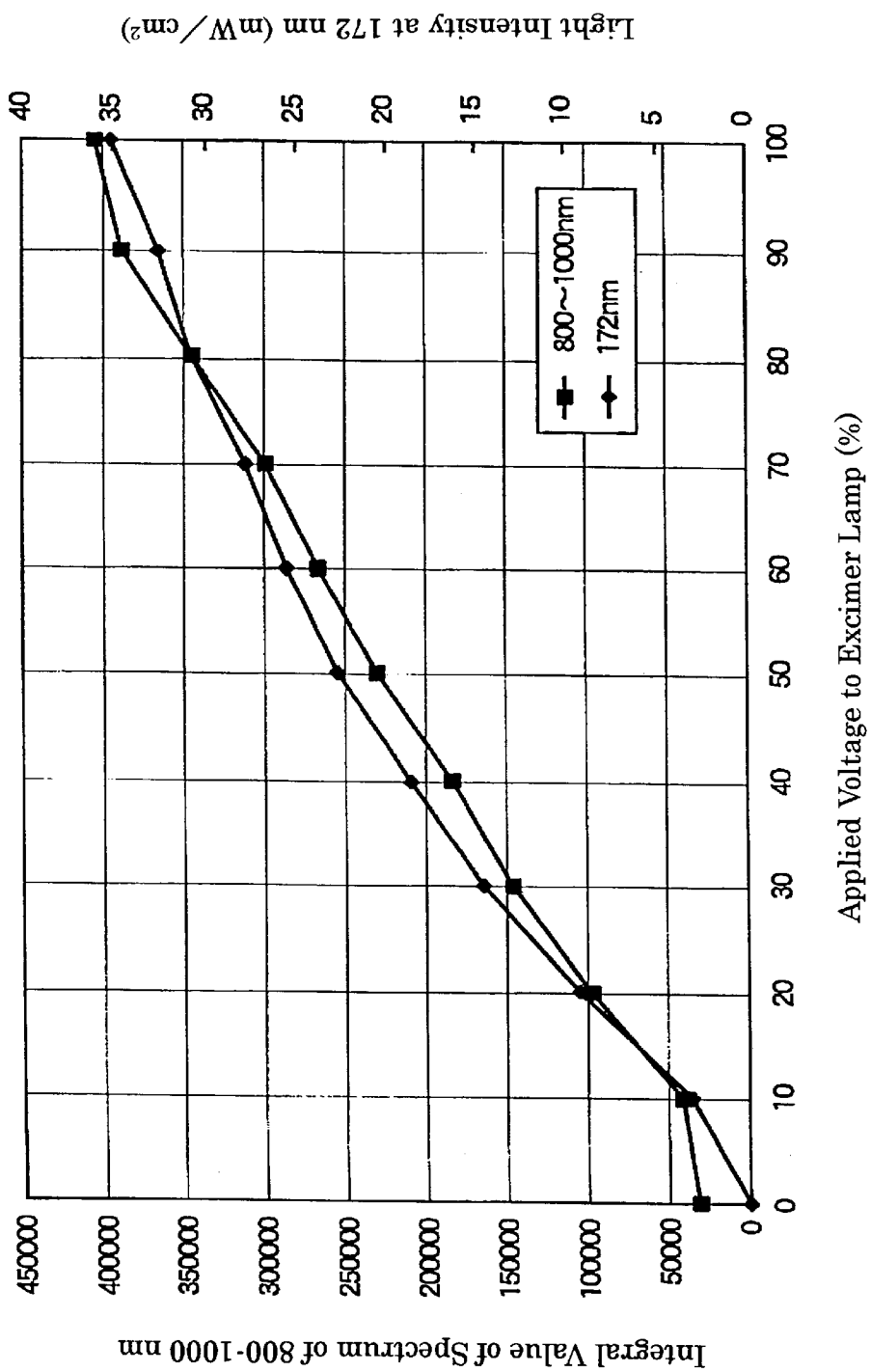
FIG. 1 is a graph showing a correlation between a light intensity of light at 172 nm and an integral value of spectrum of 800 nm to 1,000 nm light.

An electric signal photoelectrically converted with the photodiode 23 is amplified with the amplifier circuit 24 and inputted to the operating portion 25. The operating portion 25 calculates the light intensity of the xenon excimer lamp 11, i.e., the intensity of a light beam having a central wavelength of 172 nm, on the basis of the signal from the amplifier circuit 24. The operating portion 25 has a conversion table of the intensity of the light beam having a wavelength of 172 nm relative to the integral value of spectrum at 800 nm to 1,000 nm shown in FIG. 1. As shown in FIG. 1, the variable of the conversion table is a value of output from the xenon excimer lamp 11 (ratio to a maximum output). The value of the conversion table differs depending upon the xenon excimer lamp 11 used and light-receiving conditions of the photodiode 23 or the like, so that it is determined by actual measurement. The operating portion 25 calculates an integral value of spectrum at 800 nm to 1,000 nm, i.e., a total sum of light intensities thereof, on the basis of an inputted signal, to determine the corresponding intensity of light at 172 nm. The display portion 26 is a means for displaying to a user the intensity of light at 172 nm, i.e., the light intensity of the xenon excimer lamp 11, determined by the above operating portion 25. The display portion 26 can be constituted of a display device such as a liquid crystal and others. The display portion 26 is not only for displaying the above, but also may display other information such as an integral value of spectrum at 800 nm to 1,000 nm, an output value of the xenon excimer lamp 11, and the like.

In the above constitution, the light-intensity measuring apparatus 22 calculates the light intensity of the xenon excimer lamp 11 on the basis of spectrum at 800 nm to 1,000 nm detected with the photodiode 23 and displays a result.

Figure 5:
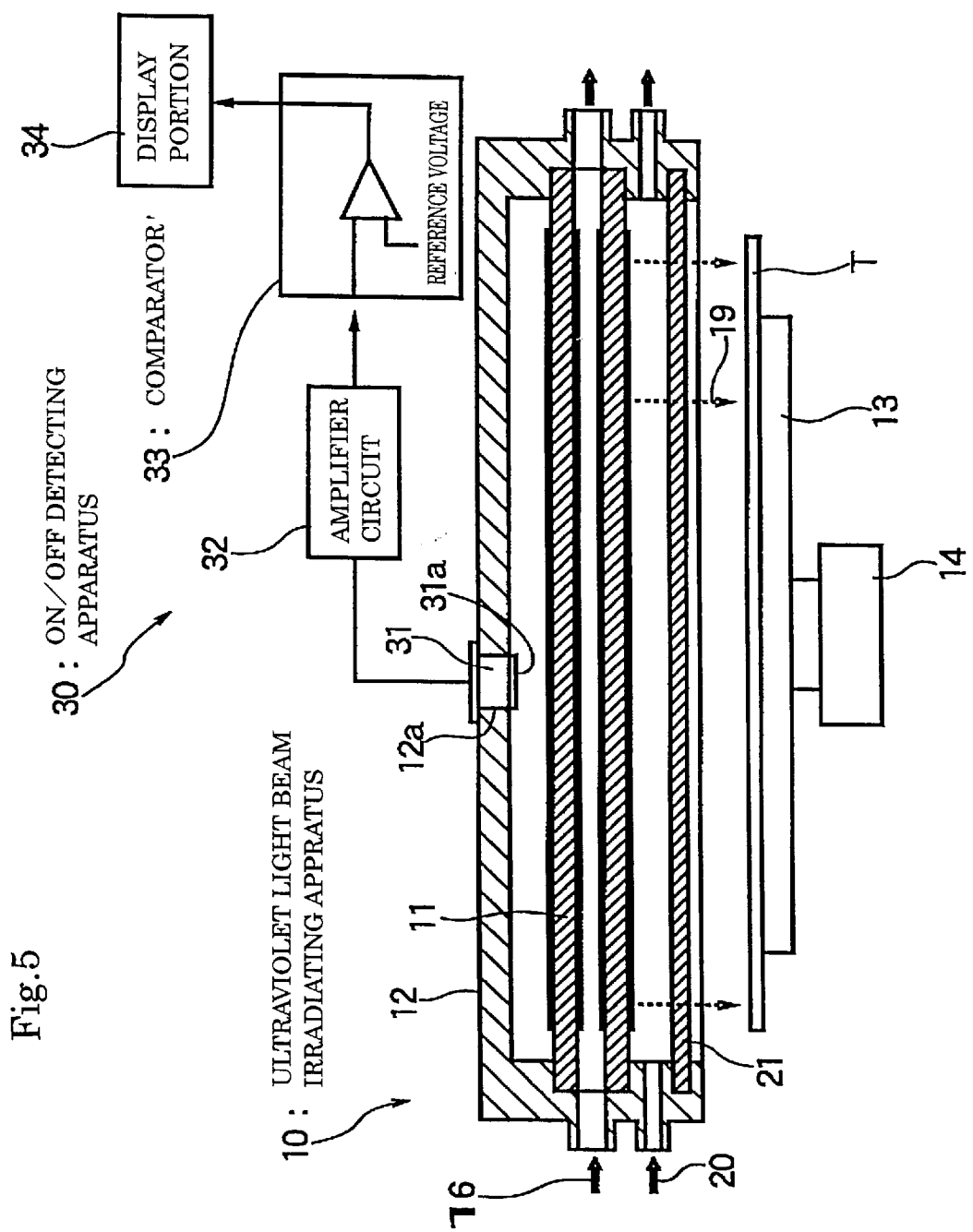
FIG. 5 is a schematic constitution drawing of an ultraviolet light beam irradiating apparatus having an on/off detecting apparatus constituted according to the present invention.

Another Example of the present invention will be explained below. FIG. 5 is a schematic constitution drawing of an ultraviolet light beam irradiating apparatus having an on/off detecting apparatus constituted according to the present invention. This Example uses an ultraviolet light beam irradiating apparatus 10 having the same constitution as that of the previous Example, so that an explanation thereof is omitted.

In this Example, the ultraviolet light beam irradiating apparatus 10 has an on/off detecting apparatus 30 that detects whether the xenon excimer lamp 11 is on or off, i.e., working or not working, and transmits a result. The on/off detecting apparatus 30 detects spectrum at 800 to 1,000 nm in place of a light beam at 172 nm radiated from the xenon excimer lamp 11 like the above light-intensity measuring apparatus 22, to determine whether the xenon excimer lamp 11 is in on- or off-state. The on/off detecting apparatus 30 for that purpose comprises a photodiode 31 as a photoelectric converting device, an amplifier circuit 32, a comparator 33 and a display portion 34.

Like the previous Example, the photodiode 31 is fit to a hole 12a made in an upper portion of the lamp housing 12 and outputs an electric signal depending upon light of spectrum at 800 nm to 1,000 nm from the xenon excimer lamp 11. Preferably, the light-receiving surface of the photodiode 31 is provided with an optical filter 31a for shutting off the incidence of disturbing light.

The electric signal photoelectrically converted with the photodiode 31 is amplified with the amplifier circuit 32, and then inputted to the comparator 33. The comparator 33 compares a predetermined reference voltage and a voltage of the electric signal from the above amplifier circuit 32 and outputs to the display portion 34 a signal showing that the lamp is on or off. That is, when the voltage of the inputted signal is in a state where it is lower than the reference voltage, the comparator 33 outputs a signal showing that the xenon excimer lamp 11 is off (e.g., Low of a binary signal). When the voltage changes to a state where it is higher than the reference voltage, the comparator 33 decides that the xenon excimer lamp 11 is turned on and outputs a signal showing the decision (e.g., High of a binary signal). In one embodiment, the above reference voltage can be determined on the basis of the voltage of an input signal when the output from the xenon excimer lamp 11 is minimum. In another embodiment, the comparator 33 can have a constitution in which it has a conversion table of a light intensity at 172 nm relative to an integral value of spectrum at 800 nm to 1,000 nm shown in FIG. 1 and the value of the above reference voltage can be determined depending upon a light intensity calculated according thereto.

A signal from the comparator 33 for showing an on- or off-state is inputted to the display portion 34, and the display portion 34 shows a user that the xenon excimer lamp is on or off. The display portion 34 may realize the above showing by lighting an LED, or the like, on or off, or may display a state of the showing with a display device such as a liquid crystal, or the like. Further, there may be employed a constitution in which an on/off monitor signal is outputted from the display portion 34. Further, the on/off detecting apparatus 30 may further comprise the operating portion 25 of the above light-intensity measuring apparatus 22, whereby there can be employed a constitution in which not only an on/off state of the xenon excimer lamp 11 but also the light intensity thereof can be displayed on the display portion 34.

In the above constitution, the on/off detecting apparatus 30 detects an on- or off-state of the xenon excimer lamp 11 on the basis of spectrum at 800 nm to 1,000 nm detected in the photodiode 31 and transmits a result.

Examples of the present invention have been explained hereinabove with reference to the drawings. However, the present invention shall not be limited to particulars shown in the above Examples, and it is clear that the present invention can be altered and improved on the basis of descriptions of claims. The above Example has shown an embodiment in which the light-intensity measuring apparatus 22 and the on/off detecting apparatus 30 are incorporated into the ultraviolet light beam irradiating apparatus 10. However, there may be employed a constitution in which these are constituted as apparatus separate from the ultraviolet light beam irradiating apparatus for measuring the light intensity thereof and detecting on- and off-states. Further, the ultraviolet light beam irradiating apparatus that can be employed in the present invention shall not be limited to those having the constitutions of the above Examples. The xenon excimer lamp may be an air-cooled lamp or one having other constitution.

As described above, for detecting a light beam from a xenon excimer lamp, the present invention can use a photoelectric converting device having photosensitivity in the range of from 800 nm to 1,000 nm, which device is supplied at a low price, so that there can be provided a small-sized less expensive light-intensity measuring apparatus and an on/off detecting apparatus for a xenon excimer lamp.

Further, a photoelectric converting device that is less deteriorated with an ultraviolet light beam can be employed as the above photoelectric converting device, so that the apparatus can be improved in durability.

What is claimed is:

1. An on/off detecting apparatus comprising:

a photodetector for a xenon excimer lamp that radiates light having a central wavelength of 172 nm, the photodetector being a photoelectric converting device having photosensitivity in the range of 800 to 1,000 nm;

a comparing means for comparing an output of said photoelectric converting device with a predetermined reference value; and a transmitting means for transmitting a determination of whether the xenon excimer lamp is on or off on the basis of a comparison result of said comparing means.

2. The on/off detecting apparatus of claim 1, which further comprises an optical filter for shutting off an input of light at 800 nm or shorter to said photoelectric converting device.

3. The on/off detecting apparatus of claim 1, wherein said photoelectric converting device is a photodiode.

4. The on/off detecting apparatus of claim 2, wherein said photoelectric converting device is a photodiode.

5. An ultraviolet light beam irradiating apparatus comprising:

a xenon excimer lamp that radiates light having a central wavelength of 172 nm, and the on/off detecting apparatus recited in claim 1.

6. An ultraviolet light beam irradiating apparatus comprising:

a xenon excimer lamp that radiates light having a central wavelength of 172 nm, and the on/off detecting apparatus recited in claim 2.

7. An ultraviolet light beam irradiating apparatus comprising:

a xenon excimer lamp that radiates light having a central wavelength of 172 nm, and the on/off detecting apparatus recited in claim 3.

8. An ultraviolet light beam irradiating apparatus comprising:

a xenon excimer lamp that radiates light having a central wavelength of 172 nm, and the on/off detecting apparatus recited in claim 4.

* * * * *